(12) United States Patent
Jeon

(10) Patent No.: US 9,225,266 B2
(45) Date of Patent: Dec. 29, 2015

(54) PIEZOELECTRIC LINEAR ACTUATOR

(71) Applicant: SAMSUNG ELECTRONICS CO., LTD., Suwon-si (KR)

(72) Inventor: In-su Jeon, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 13/914,947

(22) Filed: Jun. 11, 2013

(65) Prior Publication Data

US 2014/0159545 A1  Jun. 12, 2014

(30) Foreign Application Priority Data

Dec. 10, 2012 (KR) .................. 10-2012-0143032

(51) Int. Cl.
*H02N 2/00* (2006.01)
*H02N 2/02* (2006.01)

(52) U.S. Cl.
CPC .................. *H02N 2/025* (2013.01)

(58) Field of Classification Search
CPC .................................. H02N 2/025
USPC .......................... 310/328, 323.01
See application file for complete search history.

(56) References Cited

U.S. PATENT DOCUMENTS

| 6,410,907 | B2* | 6/2002 | Cleveland et al. ............ 250/216 |
| 6,617,761 | B2* | 9/2003 | Ando et al. .................. 310/328 |
| 2004/0201327 | A1* | 10/2004 | Cleveland et al. ............ 310/348 |
| 2009/0009033 | A1* | 1/2009 | Voigtlander et al. ..... 310/323.02 |
| 2011/0109198 | A1* | 5/2011 | Asada et al. .................. 310/328 |
| 2013/0108407 | A1* | 5/2013 | Pryadkin .................... 414/749.1 |
| 2013/0193804 | A1* | 8/2013 | Suh .............................. 310/333 |

FOREIGN PATENT DOCUMENTS

| JP | 2007-274663 A | 10/2007 |
| KR | 2001-0068646 A | 7/2001 |
| KR | 10-0845291 B1 | 7/2008 |
| WO | 93/19494 A1 | 9/1993 |

* cited by examiner

*Primary Examiner* — J. San Martin
(74) *Attorney, Agent, or Firm* — Sughrue Mion, PLLC

(57) ABSTRACT

Provided is a piezoelectric linear actuator. The piezoelectric linear actuator includes a slider having first and second surfaces facing each other, first and second plates spaced by predetermined distances from the first and second surfaces of the slider, respectively, a plurality of shear piezo stacks having one end fixed to the corresponding first or second plates, the plurality of shear piezo stacks being disposed toward the slider, and a friction member disposed on the shear piezo stacks to support the slider by a friction force with the slider. The slider includes a piezo plate expanding or contracting with respect to the shear piezo stacks according to a voltage applied thereto and a sliding member on each of both opposite surfaces of the piezo plate contacting the friction member.

8 Claims, 5 Drawing Sheets

PIEZOELECTRIC LINEAR ACTUATOR

CROSS-REFERENCE TO RELATED APPLICATION

This application claims priority from Korean Patent Application No. 10-2012-0143032, filed on Dec. 10, 2012, in the Korean Intellectual Property Office, the disclosure of which is incorporated herein in its entirety by reference.

BACKGROUND

1. Field

Apparatuses consistent with exemplary embodiments relate to a piezoelectric linear actuator including an in-situ cleaning unit.

2. Description of the Related Art

To move a probe close to a sample in scanning probe microscopes (SPMs), very accurate linear actuators having a step less than several nanometers are needed. Linear actuators, including a shear piezo driven by a slip-stick motion, are used in SPMs for ultra-high vacuum low-temperatures.

Such a linear actuator may have a smooth contact surface for the slip-stick motion. If fine particles attach to the contact surface thereof, the linear actuator may malfunction.

Since SPMs for ultra-high vacuum are used under a vacuum condition, dust, etc. in the air does not attach to the contact surface. However, if fine particles separated from a sample or pieces separated from a probe tip are inserted between two surfaces for the slip motion, the linear actuator may malfunction. Particularly, in the case of low-temperature conditions, since a deformation range of the piezoelectric material is small, the possibility of malfunction may increase.

If this trouble arises, the linear actuator may be disassembled to clean the contact surface, and then the ultra-high vacuum may be created again. Thus, it may take a long time and be too cumbersome to perform these processes. Therefore, linear actuators, which can perform in-situ cleaning on slip surfaces, are desired.

SUMMARY

One or more exemplary embodiments provide a piezoelectric linear actuator including a unit which is capable of removing particles between slipping surfaces in an operation state.

Additional exemplary aspects will be set forth in part in the description which follows and, in part, will be apparent from the description, or may be learned by practice of the presented exemplary embodiments.

According to an aspect of an exemplary embodiment, a piezoelectric linear actuator includes: a slider having first and second surfaces facing each other; first and second plates spaced by predetermined distances from the first and second surfaces of the slider, respectively; a plurality of shear piezo stacks, each having one end fixed to the corresponding first or second plates, the plurality of shear piezo stacks being disposed toward the slider; and a friction member disposed on each of the plurality of shear piezo stacks to support the slider by a friction force with the slider, wherein the slider comprises a piezo plate expanding or contracting with respect to the plurality of shear piezo stacks according to an applied voltage thereto and a sliding member on each of both opposite surfaces of the piezo plate to contact the friction member.

The piezoelectric linear actuator may further include a slider body disposed at a center of the piezo plate, wherein the piezo plate may include a first piezo plate disposed between the slider body and the friction member facing the first surface and a second piezo plate disposed between the slider body and the friction member facing the second surface.

Each of the friction member and the sliding member may be formed of alumina or sapphire.

The piezoelectric linear actuator may further include a power source which respectively applies an AC voltage and a DC voltage to both surfaces of the first and second piezo plates.

The piezoelectric linear actuator may further include a pair of leaf springs which are disposed respectively facing the first and second plates to apply a predetermined pressure to each of the first and second plates, thereby increasing a friction force between the friction member and the sliding member.

The piezoelectric linear actuator may further include a steel ball disposed between the first and second plates and the pair of leaf springs to apply a uniform force to the first and second plates.

A central hole may be formed in a center of each of the leaf springs, and the steel ball may be disposed on the central hole.

According to an aspect of another exemplary embodiment, a piezoelectric linear actuator includes: a housing that is a hollow circular cylinder with one exposed side surface; a slider that is a hollow hexagonal cylinder, which is disposed within the housing; a piezo plate attached to an inner surface of the slider; a pair of first shear piezo stack contacting two outer side surfaces that are spaced apart from each other of the slider, the pair of first shear piezo stack being disposed on inner side surface of the housing; a cover plate on the exposed side surface on which a second shear piezo stack contacting a third outer side surface of the slider is disposed, the cover plate to face the third outer side surface spaced from the two outer side surfaces, and a friction member on each of the pair of first shear piezo stack and the second shear piezo stack to contact the slider.

The piezo plate may include three piezo plates which are respectively disposed on three inner surfaces of the slider to face the pair of first shear piezo stack and the second shear piezo stack.

The piezoelectric linear actuator may further include a cylindrical cylinder inside the slider, an outer surface of the cylindrical cylinder contacting the three piezo plates.

The piezoelectric linear actuator may further include a leaf spring covering the cover plate on the one exposed side surface, the leaf spring applying a predetermined elastic force to the cover plate to increase a friction force between the friction member and the slider.

The piezoelectric linear actuator may further include an elastic force adjustment unit fixing both ends of the leaf spring on the one exposed side surface, the elastic force adjustment unit adjusting both ends of the leaf spring in vertical position with respect to the one exposed side surface to adjust the elastic force of the leaf spring.

The elastic force adjustment unit may include a bolt disposed on the one exposed side surface and a nut clamping both ends of the leaf spring together with the bolt.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
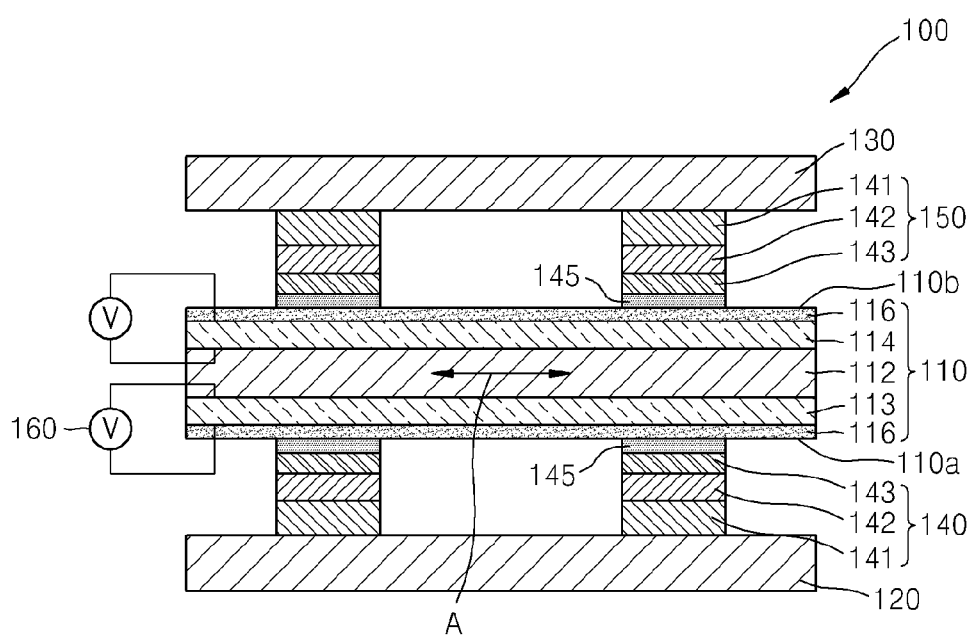
FIG. 1 is a cross-sectional view of a piezoelectric linear actuator according to an exemplary embodiment.

Reference will now be made in detail to exemplary embodiments which are illustrated in the accompanying drawings. In the figures, the dimensions of layers and areas may be exaggerated for clarity of illustration. It is of course to be understood that the embodiments described herein are merely exemplary of the invention, which can be embodied in various forms. In the description of embodiments, it will be understood that when an element is referred to as being 'on' another element, the terminology of 'on' and 'under' includes both the meanings of 'directly' and 'indirectly'. In the drawings, like reference numerals refer to like elements throughout.

FIG. 1 is a cross-sectional view of a piezoelectric linear actuator 100 according to an exemplary embodiment.

Referring to FIG. 1, first and second plates 120 and 130 are disposed so that they are spaced by predetermined distances from first and second surfaces 110a and 110b of a slider 110, respectively. The slider 110 may be a plate, and the first and second surfaces 110a and 110b may be parallel. A plurality of first shear piezo stacks 140 are fixedly disposed on the first plate 120. Each of the first shear piezo stacks 140 has one end fixed to the first plate 120. Also, the first shear piezo stacks 140 substantially vertically extend from the first plate 120 toward the first surface 110a.

A plurality of second shear piezo stacks 150 are fixedly disposed on the second plate 130. Each of the second shear piezo stacks 150 has one end fixed to the second plate 130. Also, the second shear piezo stacks 150 substantially vertically extends from the second plate 130 toward the second surface 110b. The number of the plurality of second shear piezo stacks 150 may be the same as the number of the first shear piezo stacks 140. For convenience of description, two first shear piezo stacks 140 and two second shear piezo stacks 150 are shown in FIG. 1. Also, the first and second piezo stacks 140 and 150 may be disposed to face each other at the same locations with respect to the slider 110.

Each of the first and second shear piezo stacks 140 and 150 may include a plurality of shear piezo plates, for example, three shear piezo plates 141 to 143 stacked on the corresponding first and second plates 120 and 130. The shear piezo plates 141 to 143 are polarized in a diagonal direction. Thus, when a voltage is applied, the shear piezo plates 141 to 143 may bend in the diagonal direction.

Each of the first and second shear piezo stacks 140 and 150 may include the plurality of shear piezo plates to increase a moving step size of the slider 110 at a low driving voltage.

Friction members 145 contacting the first and second surfaces 110a and 110b are attached to the first and second shear piezo stacks 140 and 150, respectively.

The slider 110 includes a slider body 112 and first and second piezo plates 113 and 114, which are disposed on both surfaces of the slider body 112. A sliding member 116 is attached to each of the first and second piezo plates 113 and 114. The sliding member 116 is supported by a friction force with the friction member 145.

A power source 160 for applying an AC voltage and a DC voltage is connected to each of both surfaces of the first and second piezo plates 113 and 114. When the AC voltage is applied to the first and second piezo plates 113 and 114, the first and second piezo plates 113 and 114 vibrate while being repeatedly expanded and contracted. As a result, particles attached to the first and second surfaces 110a and 110b may separate. That is, in-situ cleaning may be performed.

A predetermined DC voltage may be applied to each of the first and second piezo plates 113 and 114 to adjust the friction force between the sliding member 116 and the friction member 145. For example, when a DC voltage is applied to each of the first and second piezo plates 113 and 114 in the expansion direction of the first and second piezo plates 113 and 114, a friction force between the slider 110 and each of the first and second shear piezo stacks 140 and 150 may increase. In an opposite case, the friction force may decrease. Also, the intensity of the friction force may be adjusted through the intensity of the applied voltage.

The slider 110 is supported by predetermined friction forces between the first and second shear piezo stacks 140 and 150. The slider 110 may be driven in an arrow A direction by the first and second shear piezo stacks 140 and 150. The piezoelectric linear actuator 100 may be a uniaxial driving actuator.

Each of the friction member 145 and the sliding member 116 may be formed of alumina or sapphire. In the embodiment of FIG. 1, the sliding member 116 is formed of sapphire, and the friction member 145 is formed of alumina.

Figure 2:
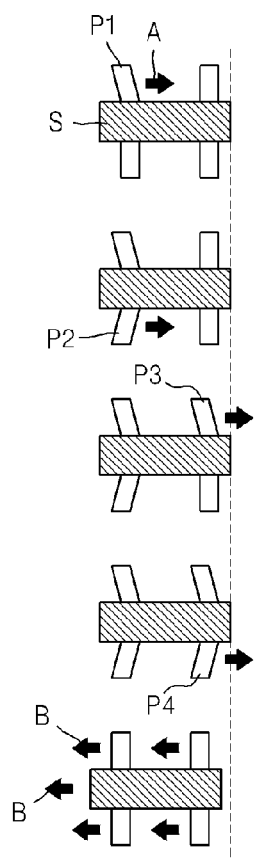
FIG. 2 is a view for explaining an operation of the piezoelectric linear actuator of FIG. 1.
Figure 2:
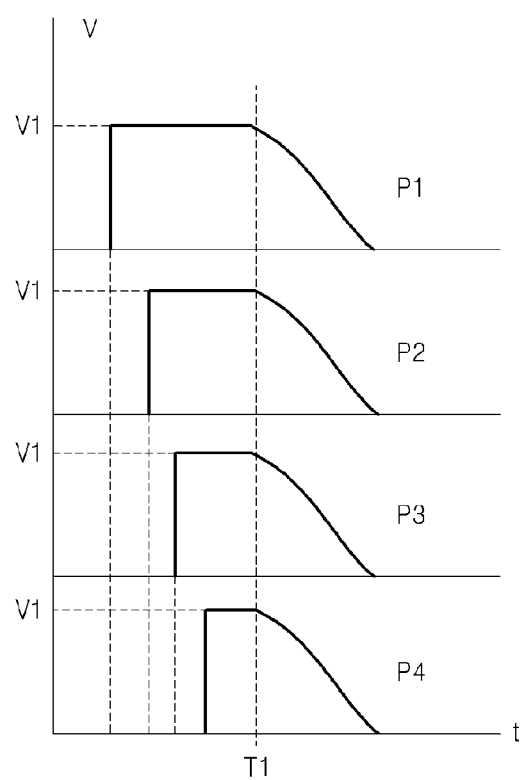

FIG. 2 is a view for explaining an operation of the piezoelectric linear actuator 100 of FIG. 1. FIG. 2 illustrates a schematic structure of the piezoelectric linear actuator of FIG. 1. For convenience of description, only a slider S and first to fourth shear piezo stacks P1 to P4 are illustrated schematically. The slider S and the first to fourth shear piezo stacks P1 to P4 correspond to the slider 110 and the first and second shear piezo stacks 140 and 150 of FIG. 1, respectively.

Referring to FIG. 2, when a predetermined pulse voltage V1 is applied to the first shear piezo stack P1, the friction member (see reference numeral 145 of FIG. 1) is moved along the sliding member (see reference numeral 116 of FIG. 1) in a polarizing direction of the first shear piezo stack P1, i.e., in an arrow A direction. Here, a shearing force from the first shear piezo stack P1 is less than a friction force between the slider S and the shear piezo stack P1. Thus, the first shear piezo stack P1 slides with respect to the slider 110 in the arrow A direction.

When the predetermined pulse voltage V1 is sequentially applied to the second to fourth shear piezo stacks P2 to P4, each of the second to fourth shear piezo stacks P2 to P4 slides.

After the fourth shear piezo stack P4 slides, the voltage applied to the first to fourth shear piezo stacks P1 to P4 may be cut off at the same time (see a time T1 of FIG. 2). In this case, if the sum of the shearing forces of the first to fourth shear piezo stacks P1 to P4 is greater than the friction force between each of the first to fourth shear piezo stacks P1 to P4 and the slider S, when the first to fourth shear piezo stacks P1 to P4 are moved at the same time in an arrow B direction, the slider S is moved in the arrow B direction by the friction force between each of the first to fourth shear piezo stacks P1 to P4 and the slider S. When the above-described operation is repeated at a predetermined frequency, the slider S is moved in the arrow B direction.

If the voltage applied to each of the first to fourth shear piezo stacks P1 to P4 is changed in polarity, the slider S may be moved in the arrow A direction.

Figure 3:
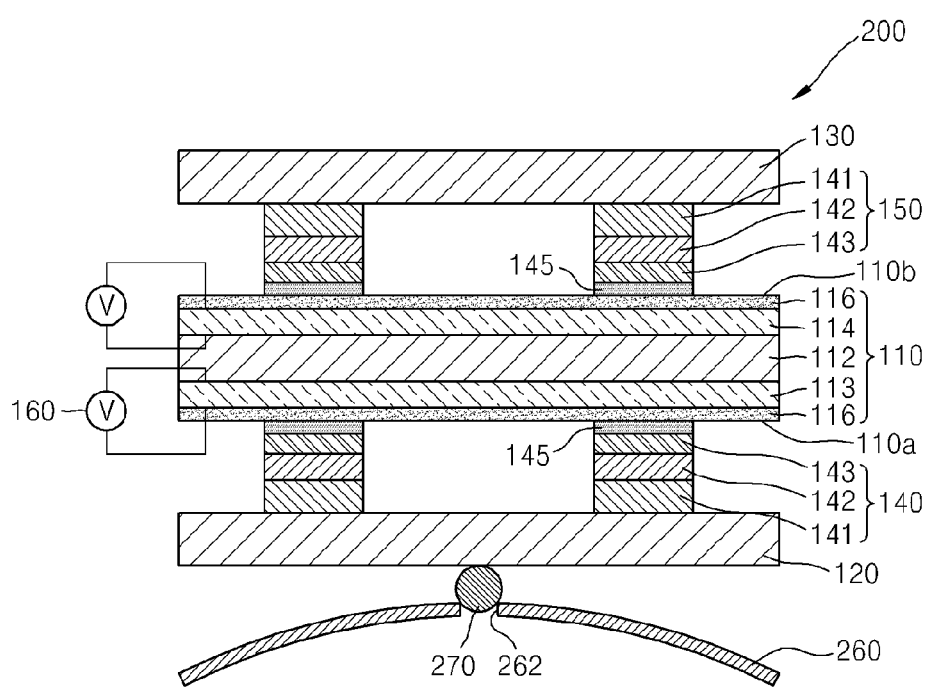
FIG. 3 is a schematic cross-sectional view illustrating a structure of a piezoelectric linear actuator according to another exemplary embodiment.

FIG. 3 is a schematic cross-sectional view illustrating a structure of a piezoelectric linear actuator 200 according to another example embodiment. In the current embodiment, like reference numerals refer to like elements throughout, and also, their detailed descriptions will be omitted.

Referring to FIG. 3, a device applying an elastic force to each of first and second plates 120 and 130 may be disposed on each of outer sides of the first and second plates 120 and 130. For example, a leaf spring 260 may be provided. For convenience of description, although the leaf spring 260 is disposed on only a side surface of the first plate 120 in FIG. 3, another leaf spring 260 may be disposed on a side surface of the second plate 130. The leaf spring 260 may vertically push the corresponding first plate 120 to increase a friction force between the sliding member 145 and the friction member 116. A slider 110 may be slidably supported between the first and second shear piezo stacks 140 and 150 through the leaf spring 260.

A metal ball 270 may be disposed between the leaf spring 260 and each of the first and second plates 120 and 130. A central hole 262 may be formed in a center of the leaf spring 260. The metal ball 270 may be disposed in the central hole 262 of the leaf spring 270 to uniformly transfer an elastic force of the leaf spring 260 to the first and second plates 120 and 130.

Figure 4:
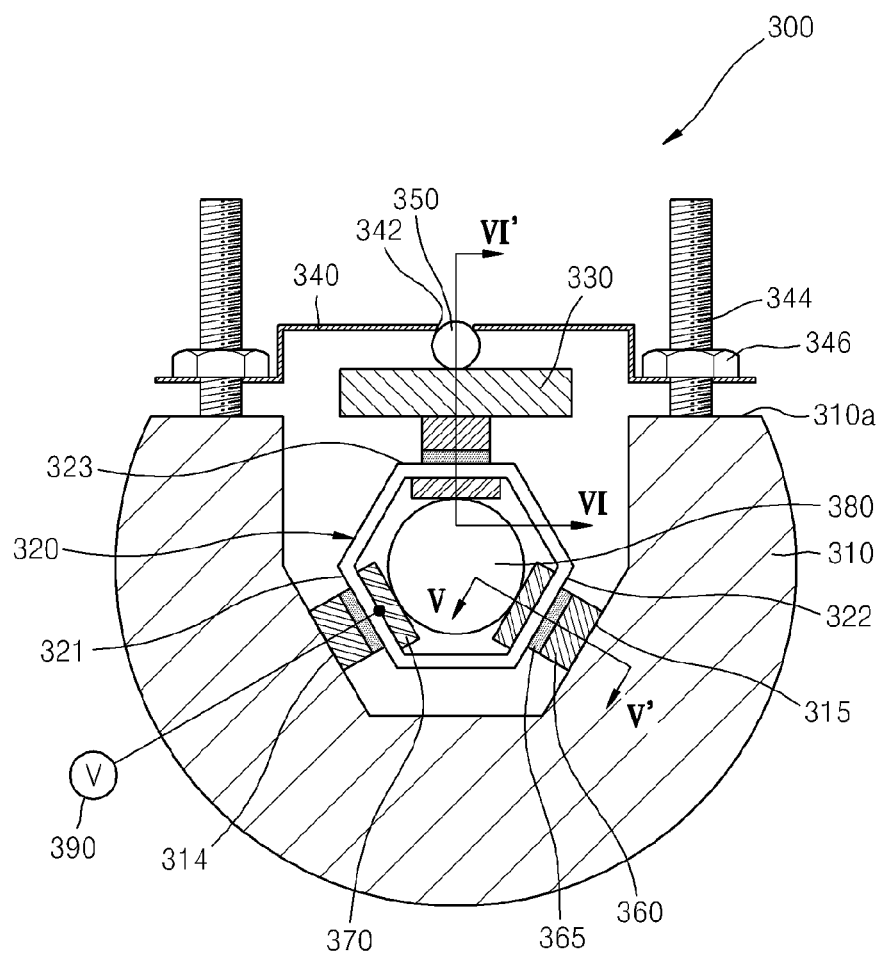
FIG. 4 is a schematic plan view illustrating a structure of a piezoelectric linear actuator according to still another exemplary embodiment.
Figure 5:
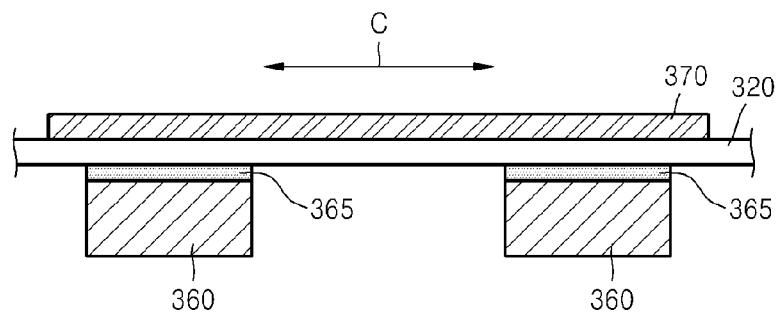
FIGS. 5 and 6 are cross-sectional views taken along lines IV-IV' and V-V' of FIG. 4, respectively.
Figure 6:
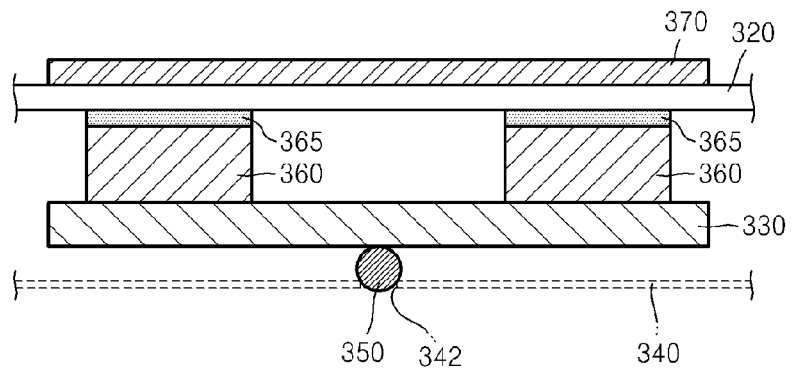

FIG. 4 is a schematic plan view illustrating a structure of a piezoelectric linear actuator 300 according to still another example embodiment. FIGS. 5 and 6 are cross-sectional views taken along lines V-V' and VI-VI' of FIG. 4, respectively.

Referring to FIGS. 4 to 6, a slider 320 that is a hollow hexagonal cylinder is disposed within a hollow circular housing 310 having one exposed surface 310a. A fourth surface 314 and a fifth surface 315, which respectively correspond to a first surface 321 and a second surface 322 of the slider 320, are formed on an inner surface of the housing 310. A third surface 323 of the slider 320 is disposed on an exposed portion of the housing 310. The first to third surfaces 321 to 323 may be surfaces that are spaced apart from each other among six surfaces of the hexagonal slider 320. A cover plate 330 is disposed above the third surface 323. The cover plate 330 may perform the same function as each of the fourth surface 314 and the fifth surface 315. A leaf spring 340 is disposed on an outer surface of the cover plate 330. The leaf spring 340 may have both ends fixed to the surface 310a of the housing 310 by a bolt 344 and a nut 346, which are fixed to the one exposed surface 310a of the housing 310. Thus, both ends of the leaf spring 340 may be adjusted in vertical position with respect to the one surface 310a of the housing 310 by the bolt 344 and the nut 346. The leaf spring 340 may be adjusted in vertical position of both ends thereof to adjust an elastic force to be applied to the cover plate 330. The bolt 344 and the nut 346 may constitute an elastic force adjustment unit for adjusting the elastic force of the leaf spring 340.

A plurality of shear piezo stacks, for example, two shear piezo stacks 360, may be disposed between each of the first and second surfaces 321 and 322 of the slider 320 and the housing 310 and between the third surface 323 of the slider 320 and the cover plate 330. The shear piezo stacks 360 have one ends fixed to the housing 310 and the cover plate 330 and the other end slidably disposed on the slider 320.

A friction member 365 is attached to each of surfaces of the shear piezo stacks 360 adjacent to a surface of the slider 320. The friction member 365 has a predetermined friction force against the surface of the slider 320.

A central hole 342 is formed in a center of the leaf spring 340. A metal ball 350 is disposed on the central hole 342. The metal ball 350 may uniformly apply the elastic force of the leaf spring 340 to the fourth surface 314, the fifth surface 315, and the cover plate 330 which respectively correspond to the first to third surfaces 321 to 323.

A piezo plate 370 is disposed on each of inner surfaces facing the first to third surfaces 321 to 323 of the slider 320. A cylindrical cylinder 380 is disposed within the hollow hexagonal slider 320 to contact the piezo plates 370.

The cylindrical cylinder 380 may have any of various shapes. When a probe is mounted on the cylindrical cylinder 380, the piezoelectric linear actuator 300 of FIG. 4 may be used as a scanning-tunneling microscopy (STM) head.

A power source 390, which is capable of applying an AC voltage and a DC voltage, is connected to both surfaces of the piezo plate 370. When the AC voltage is applied to the piezo plate 370, the piezo plate 370 may vibrate while being repeatedly expanded and contracted. As a result, particles attached to the first to third surfaces 321 to 323 may separate. That is, in-situ cleaning may be performed.

Although three piezo plates 370 are provided in the current embodiment, the present disclosure is not limited thereto. For example, the piezo plates 370 may be one piezo plate filling an inner surface of the slider 320 or one hollow piezo plate.

When a predetermined DC voltage is applied to the piezo plates 370, a friction force between the slider 320 and the shear piezo stacks 360 may be adjusted. For example, when a DC voltage is applied to the piezo plates 370 in an expansion direction of the piezo plates 370, the friction force between the slider 320 and the shear piezo stacks 360 may increase. In an opposite case, the friction force may decrease. Also, the intensity of the friction force may be adjusted through the intensity of the applied voltage.

Each of the shear piezo stacks 360 may include three shear piezo plates (see reference numerals 141 to 143 of FIG. 1). The shear piezo stack 360 may increase a moving step size of the slider 320 at a low driving voltage application thereto. Since the operation of the shear piezo stack 360 is well known from the foregoing embodiments, a detailed description thereof is omitted.

The slider 320 is supported by a predetermined friction force due to the shear piezo stack 360. The slider 320 is driven in an arrow C (see FIG. 5) direction by the operation of the shear piezo stack 360.

Each of the friction member 365 and the slider 320 may be formed of alumina or sapphire.

According to the exemplary embodiments, an AC voltage may be applied to a piezo plate to separate particles attached to the sliding surface through an in-situ cleaning.

Also, a DC voltage may be applied to the piezo plate to adjust the elastic force applied to the sliding surface.

It should be understood that the exemplary embodiments described herein should be considered in a descriptive sense only and not for purposes of limitation. Descriptions of features or aspects within each embodiment should typically be considered as available for other similar features or aspects in other embodiments. Thus, the spirit and scope of the present inventive concept should be defined by the following claims.

What is claimed is:
1. A piezoelectric linear actuator comprising:
   a slider having a first surface and a second surface opposite the first surface;
   a first plate spaced by a first predetermined distance from the first surface of the slider and a second plate spaced a second predetermined distance from the second surface of the slider;

a plurality of shear piezo stacks, each having a first end fixed to one of the first plate and the second plate, and a second end which faces the slider;

wherein the slider comprises a piezo plate which expands or contracts according to an applied voltage thereto, a first sliding member disposed on a first surface of the piezo plate and a second sliding member disposed on a second surface of the piezo plate; and wherein the piezoelectric linear actuator further comprises a friction member disposed on the second end of each of the plurality of shear piezo stacks, such that the slider is supported by the friction members by a friction force between the friction members and one of the first sliding member and the second sliding member.

2. The piezoelectric linear actuator of claim 1, wherein the piezo plate comprises a first piezo plate and a second piezo plate, and the slider further comprises a slider body disposed between the first piezo plate and the second piezo plate.

3. The piezoelectric linear actuator of claim 1, wherein each of the friction member and the sliding member is formed of one of alumina and sapphire.

4. The piezoelectric linear actuator of claim 3, further comprising a power source which applies at least one of an AC voltage and a DC voltage to each of the first plate and the second piezo plate.

5. The piezoelectric linear actuator of claim 1, further comprising a first leaf spring facing the first plate and applying a pressure on the first plate and a second leaf spring facing the second plate and applying a pressure on the second plate, thereby increasing a friction force between the friction member and the sliding member.

6. The piezoelectric linear actuator of claim 5, further comprising a first steel ball disposed between the first plate and the first leaf spring, applying a uniform force on the first plate, and a second steel ball disposed between the second plate and the second leaf spring, applying a uniform force on the second plate.

7. The piezoelectric linear actuator of claim 6, wherein the first steel ball is disposed in a central hole in a center of the first leaf spring and the second steel ball is disposed in a central hole in a center of the second leaf spring.

8. A piezoelectric linear actuator comprising:
a slider,
a first plate facing a first side of the slider and a second plate facing a second side of the slider;
at least one first shear piezo stack disposed between the first side of the slider and the first plate and at least one second shear piezo stack disposed between the second side of the slider and the second plate; and
at least one first friction member disposed between the at least one first shear piezo stack and the first side of the slider and at least one second friction member disposed between the at least one section shear piezo stack and the second side of the slider;
wherein the slider comprises a piezo plate which expands and contracts based on a voltage applied thereto, a first sliding member disposed on a first surface of the piezo plate and a second sliding member disposed on a second surface of the piezo plate; and
wherein the slider is supported between the at least one first friction member and the at least one second fraction member.

* * * * *